Dec. 18, 1923.  G. GETTING ET AL  1,478,114
DRIVING BELT
Filed Oct. 25, 1922   3 Sheets-Sheet 1
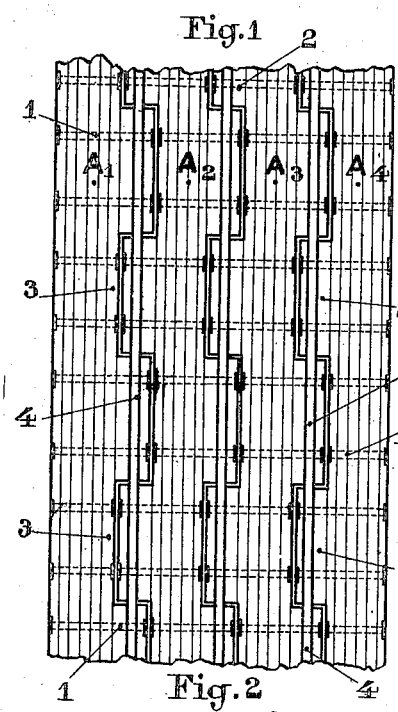
Fig. 1
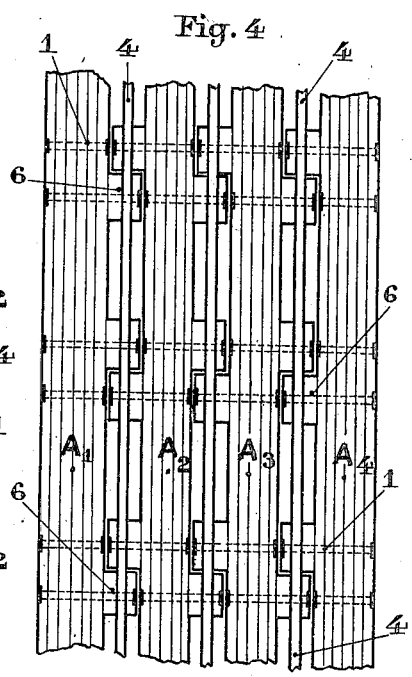
Fig. 4
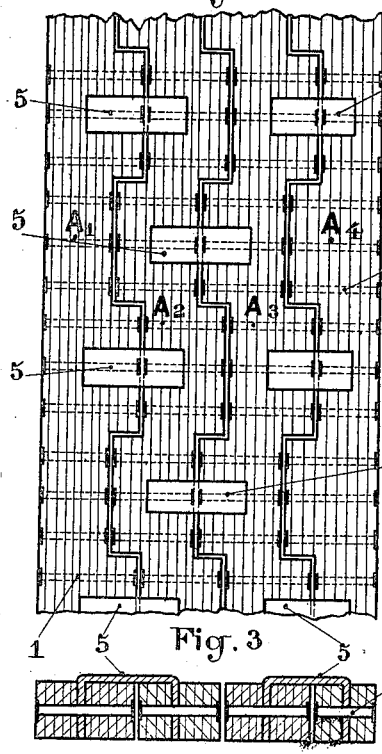
Fig. 2
Fig. 3
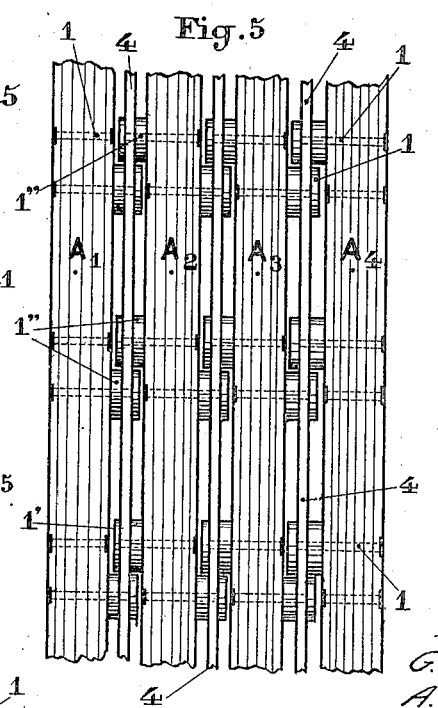
Fig. 5
Inventors
G. Getting
A. Jonas
by
Langner, Parry, Yard & Langner
Attys.

Dec. 18, 1923.

G. GETTING ET AL
DRIVING BELT
Filed Oct. 25, 1922

Inventors
G. Getting
A. Jonas
by
Langner, Parry, Card & Langner
Atty's.

Patented Dec. 18, 1923.

1,478,114

UNITED STATES PATENT OFFICE.

GEORGES GETTING AND ADRIEN JONAS, OF ST.-DENIS, FRANCE.

DRIVING BELT.

Application filed October 25, 1922. Serial No. 596,884.

*To all whom it may concern:*

Be it known that we, GEORGES GETTING and ADRIEN JONAS, both French citizens, and residents of 2 Rue Coquenard, St.-Denis, Seine, France, have invented certain new and useful Improvements in Driving Belts (for which we have filed applications in France dated, respectively, November 22, 1921, and March 21, 1922), of which the following is a specification.

This invention relates to driving belts composed of parallel belt elements consisting of leather thongs or strips placed on end, the said belt elements having laterally projecting portions and lateral recesses adapted to interengage in such a manner that the belt elements forming the belt cannot move longitudinally relatively one to the other, these belt elements being connected together by longitudinal or transverse bands of leather or by equivalent means.

In the accompanying drawings;

Fig. 1 illustrates one form of construction of a driving belt according to this invention;

Figs. 2 and 3 show in plan and cross section, a belt of the same general construction;

Fig. 4 shows a modification;

Figure 5:
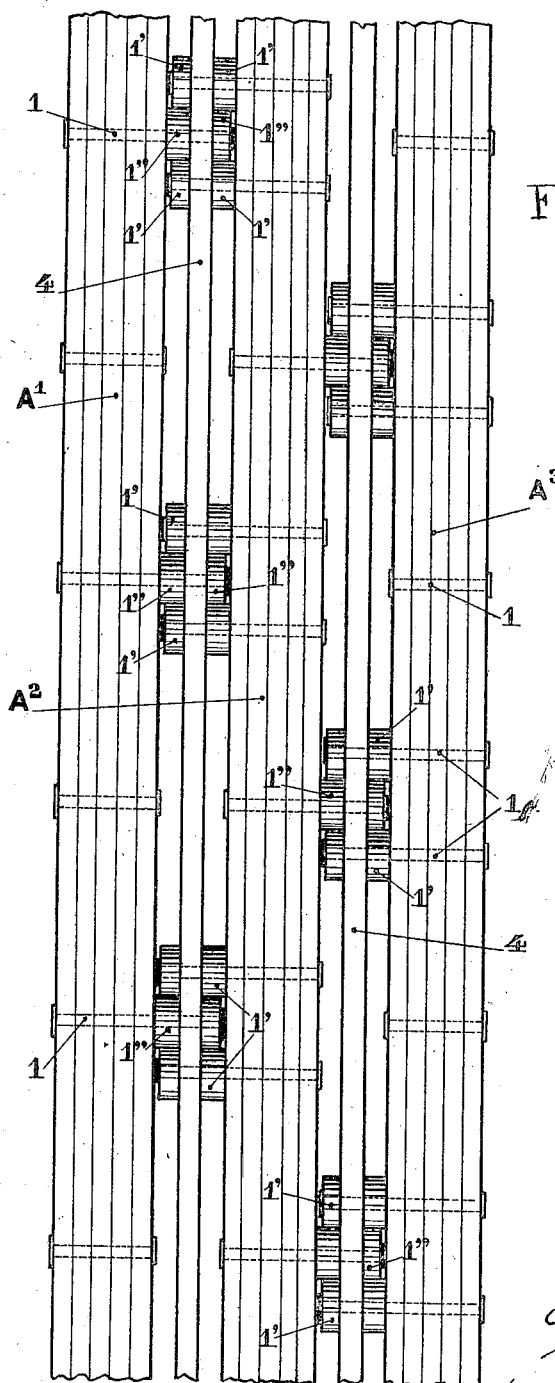
Fig. 5 shows a second modification, similar to Fig. 4.

In Figure 1 of the accompanying drawings is illustrated one form of construction of a driving belt according to this invention, this belt being composed of a suitable number of belt elements $A^1$, $A^2$, $A^3$, $A^4$, four of which are shown in the drawing.

Each of the belt elements consists of a plurality of leather thongs or strips placed edgewise and connected together by rivets 1.

Each of the belt elements is provided along its lateral edges with projecting portions 2 and recesses at 3, the projecting portions and recesses being so arranged that the projecting portions of one belt element engage with the recesses in the adjacent belt element. In this manner the belt elements are positively connected together in the longitudinal direction and when the belt is in operation the separate elements cannot move relatively one to the other in the longitudinal direction.

The belt elements at the outer sides of the belt are not provided with projecting portions or recesses at their outer edges as will be well understood.

The belt elements are connected together by means of longitudinal leather bands 4 arranged about midway across the projecting portions and recesses, these bands 4 being connected to the strips forming the belt elements by means of the rivets 1 connecting together said strips.

Figs. 2 and 3 show in plan and cross section a belt of the same general construction consisting of belt elements with lateral projecting portions and recesses interengaging one with the other, but wherein the elements are connected together by cross pieces of leather 5 of U-shape, these U-shaped bands 5 connecting together two adjacent elements and being connected thereto by the rivets securing together the strips forming the elements.

Fig. 4 shows a modification of construction wherein the interengagement of the projecting portions and recesses 2 and 3 is interrupted in the longitudinal direction.

In this form of construction it is more correct to say, instead of employing the expression projecting portions and recesses, that the belt elements are provided at their sides with projecting portions 6 which form projections adapted to interengage one with another. By reason of this construction the surface of the belt is provided with empty spaces between the projections 6.

Fig. 5 shows another form of construction similar to that shown in Figure 4, in which the interengaging projections are not formed by the belt elements themselves, but by the heads $1''$ of the securing rivets, which are of suitable shape for this purpose.

Fig. $5^{bis}$ shows a modification of the construction illustrated in Figure 5.

In this construction, which illustrates a belt formed of three belt elements $A^1$, $A^2$, $A^3$, the interengagement is effected at each point by the heads of three securing rivets, the head or bush $1''$ of one rivet engaging in the space formed between the heads or bushes $1'$ of the rivets projecting from the adjacent belt element.

By reason of this construction the interengagement between the belt elements is effected in a particularly efficient manner.

It will be understood that the interengaging portions such as 1' and 1" may be formed either by the heads of the rivets themselves and suitably rounded, or by means of bushes mounted upon the rivets, these bushes being of metal, leather, or other suitable material.

Figure 6:
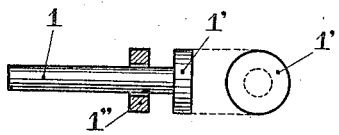
Figs. 6 and 7 show a suitable construction of rivet.
Figure 7:
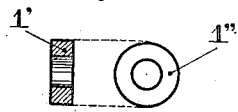

Figs. 6 and 7 show by way of example a suitable construction of rivet consisting of a stem 1, a head 1' and a bush 1" so arranged that the connecting band 4 will be held between the head 1 and the bush 1".

Figure 8:
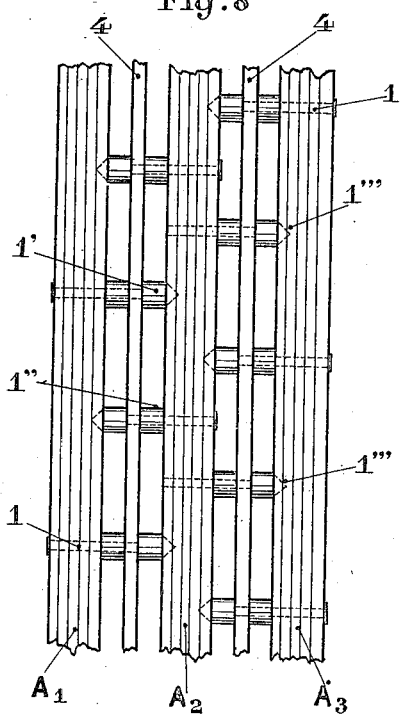
Fig. 8 shows a further modification.

Fig. 8 shows another form of construction wherein rivets similar to those shown in Figs. 6 and 7 are provided with a conical head 1''' which is adapted to penetrate into the adjacent belt element, which latter for this purpose may be provided in the required positions with small metallic caps.

Figure 9:
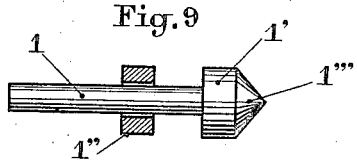
Fig. 9 is a detail of a rivet.

Fig. 9 shows a detail view of such a rivet.

It will be understood that various modifications may be made, the characteristic feature being always the construction of the belt from a plurality of belt elements each of which is formed of a plurality of thongs or strips of leather placed edgewise, each of the belt elements having laterally projecting portions and recesses arranged in such a manner that the recesses and projecting portions of adjacent belt elements will interengage so as to prevent any relative longitudinal movement between the adjacent belt elements, the belt elements being connected together by longitudinal or transverse bands. In this manner a belt is formed which is particularly homogenous in operation and affords the best conditions for driving, by means of which it is possible to obtain the maximum work and efficiency from a belt of given dimensions.

Having thus described our invention what we claim as new and desire to secure by Letters Patent is:—

1. A driving belt comprising a plurality of belt elements, each of said belt elements consisting of a plurality of leather strips or thongs, the adjacent edges of the belt elements having projecting portions and recesses, said projecting portions and recesses of one belt element being adapted to interengage with the projecting portions and recesses of the adjacent elements, means connecting together the strips or thongs to form the belt elements and means connecting together the belt elements.

2. A driving belt comprising a plurality of belt elements, each of said elements consisting of a plurality of strips or thongs placed edgewise, means connecting together said strips so as to form separate belt elements, projections formed on the outer sides of said belt elements, the projections of one belt element engaging with the projections of the adjacent belt element, and means connecting together the belt elements.

3. A driving belt comprising a plurality of belt elements, each of said belt elements consisting of a plurality of longitudinal strips of leather placed edgewise, rivets connecting together the strips of said belt elements, said rivets having enlarged heads, bushes mounted on said rivets, the bushes on the rivets of one belt element being adapted to engage with the bushes on the rivets of the adjacent belt element, and longitudinal bands secured between the heads and bushes of adjacent rivets, said bands serving to connect together adjacent belt elements.

4. A driving belt comprising a plurality of belt elements, each of said elements consisting of a plurality of longitudinal strips of leather placed edgewise, rivets connecting together said strips to form the separate elements, enlarged heads formed on some of said rivets, bushes on the rivets formed with enlarged heads, the head and bush of one rivet being adapted to engage the space formed between the heads and bushes of two rivets on the adjacent belt elements whilst a space is left between the separate sets of interengaging rivets, and a longitudinal band engaged between the heads and bushes of the interengaging rivets.

GEORGES GETTING,
ADRIEN JONAS.